Nov. 28, 1961   HANS-JOACHIM M. FOERSTER ET AL   3,010,335
SERVO STEERING MECHANISM FOR MOTOR VEHICLES
Filed June 7, 1957                                2 Sheets-Sheet 1
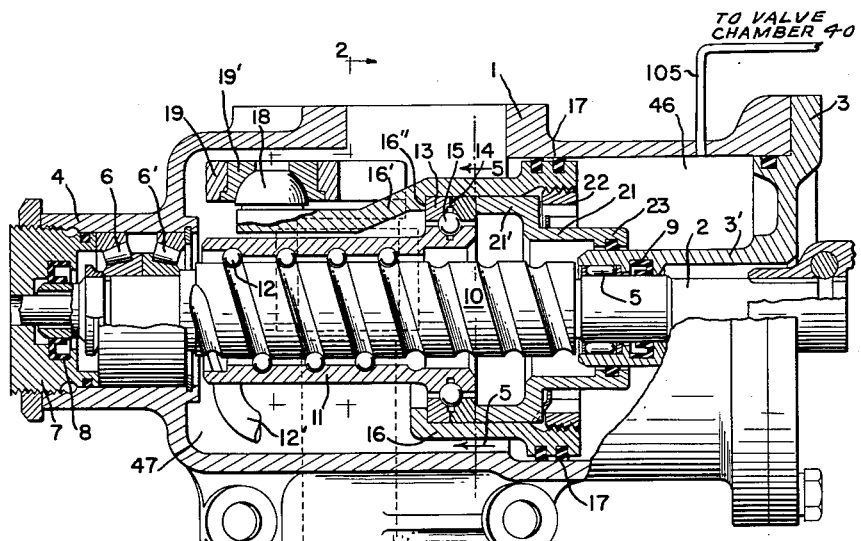
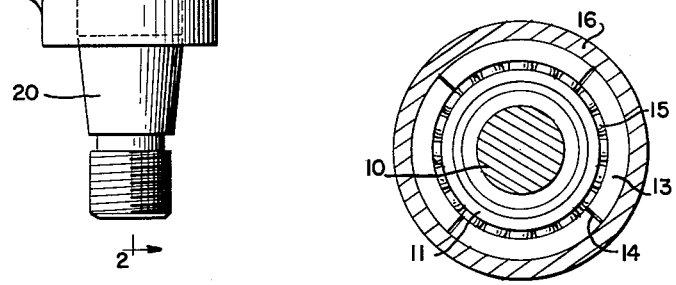
INVENTORS
HANS-JOACHIM M. FOERSTER
JOSEF A. HELMER
BY
ATTORNEYS

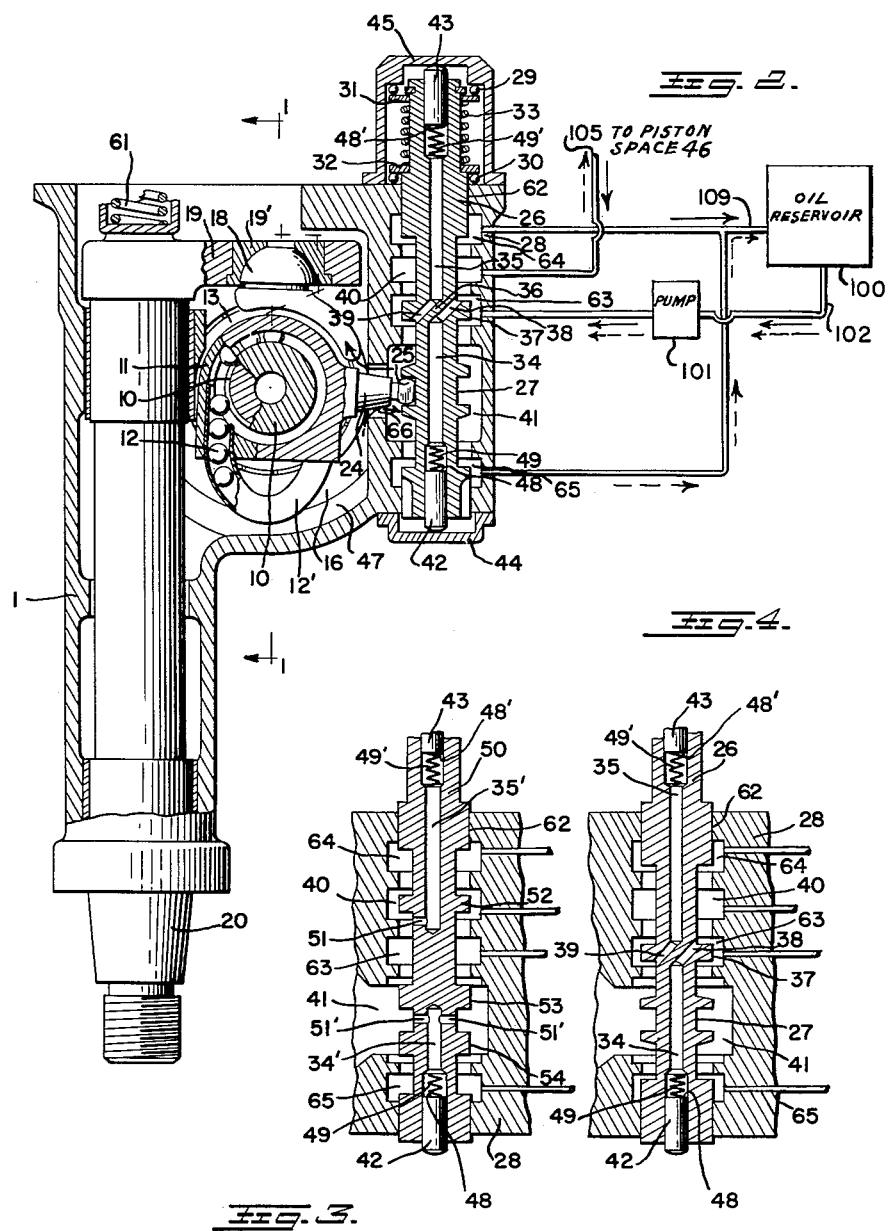

United States Patent Office 3,010,335
Patented Nov. 28, 1961

3,010,335
SERVO STEERING MECHANISM FOR
MOTOR VEHICLES
Hans-Joachim M. Foerster, Stuttgart-Bad, Cannstatt, and Josef A. Helmer, Stuttgart-Unterturkheim, Germany, assignors to Daimler-Benz Aktiengesellschaft, Stuttgart-Unterturkheim, Germany
Filed June 7, 1957, Ser. No. 664,318
Claims priority, application Germany June 7, 1956
24 Claims. (Cl. 74—388)

The present invention relates to a servo steering mechanism for motor vehicles provided with one or several chains of balls arranged about the steering spindle and with a movable steering nut member with which a lever arm engages which in turn actuates the steering lever shaft.

Steering mechanisms, especially also servo or power steering mechanisms, are known in the prior art which are provided with chains of balls arranged about the steering spindle and transmitting the steering movement from the steering spindle to the steering gear nut member by the engagement of the balls in external helical grooves of the former and complementary internal helical grooves in the latter. The problems in the steering mechanisms, in general, as well as also in servo steering mechanisms is that frictional forces occur and that these frictional forces amounted to a considerable and significant value in the commonly used steering mechanisms as well as in the servo steering mechanisms used heretofore even if such mechanisms were equipped with chains of anti-friction balls to reduce these frictional forces. Even with a servo or power steering mechanism, relatively large forces still had to be overcome and, in particular, relatively large angular movements were required at the steering wheel before the pressures in the servo cylinders became sufficiently large in order to enable the servo steering mechanism to become responsive and therewith to permit the additional servo forces to become effective for actuation of the steered wheels.

The present invention aims at avoiding the aforementioned disadvantages, and has in particular as its object a power steering mechanism in which smaller forces are necessary for the actuation of the steering mechanism and in which also smaller angular movements are required at the steering column for the steering mechanism to become responsive.

Accordingly, it is an object of the present invention to provide a steering mechanism, and particularly a power steering mechanism in which smaller forces are necessary for the actuation of the servo mechanism.

Another object of the present invention is to provide a steering mechanism in which the frictional forces are effectively reduced.

A still further object of the present invention resides in the provision of a steering mechanism, and particularly of a power steering mechanism in which smaller angular movements are necessary to bring the servo mechanism into operation.

A further object of the present invention is to increase the sensitivity of the power steering mechanism as to make it relatively highly sensitive yet assure safety of operation thereof.

Still another object of the present invention lies in the provision of a very compact and small steering gear mechanism, especially for use with a power steering mechanism by utilizing existing parts as cylinder and piston members of the servo mechanism.

Another object of the present invention is the provision of a steering mechanism which facilitates the adjustment of the steering ratio within certain limits.

Still another object of the present invention is the provision of a steering mechanism construction which prevents excessive play within the various parts transmitting the steering movement even though satisfactory operation between all parts is assured.

A still further object of the present invention is to provide a control mechanism for the power steering mechanism which utilizes the thread-like force-locking arrangement between the worm and nut member to actuate the servo mechanism.

A further object of the present invention is the provision of a servo steering mechanism in which ready adjustment and compensation for excessive play is available between the steering parts and in the various bearings thereof.

These and other objects, features and advantages of the present invention will become more obvious from the following description when taken in connection with the accompanying drawing, which shows, for purposes of illustration only, several embodiments in accordance with the present invention, and wherein:

FIGURE 1 is a cross-sectional view taken along line 1—1 of FIGURE 2 of a steering mechanism in accordance with the present invention;

FIGURE 2 is a cross-sectional view taken along line 2—2 of FIGURE 1;

FIGURE 3 is a cross-sectional view through a control valve member for a steering worm with a left-handed thread;

FIGURE 4 is a cross-sectional view of the embodiment of the control valve member for a steering worm having a right-handed thread, as shown also in FIGURE 2; and FIGURE 5 is a partial sectional view taken on lines 5—5 of FIGURE 1 and illustrating the structure of one of the bearing races.

The present invention consists essentially in that the steering gear nut member serves as actuating member for a spool-type control-valve member disposed with the longitudinal axis thereof preferably perpendicularly to the longitudinal axes of the steering spindle and of the steering lever shaft. For purposes of transmitting the steering forces from the steering spindle to the control valve member, the present invention contemplates using the force-locking arrangement due to the thread-like configuration of as well as any residual friction between the steering gear worm provided on the outside of the lower end of the steering spindle and the steering gear nut member which may occur during rotation of the steering spindle notwithstanding the anti-friction balls disposed therebetween. As a result thereof, the steering gear nut member is taken along in the direction of rotation about the steering spindle and a control valve member arranged in proximity to the steering gear nut member is displaced in the one or the other direction by an arm arranged at the steering gear nut member. The control valve member is thereby arranged in proximity to the steering gear worm preferably perpendicularly to the longitudinal direction of the steering spindle and parallel to the longitudinal direction of the steering lever shaft. A very highly sensitive and responsive servo-steering mechanism results from the use of the steering gear nut member as control or actuating organ with which only relatively small angular movements are required at the steering spindle for rendering the servo-steering mechanism responsive. In order to further keep the frictional forces within small limits, the arm, which is arranged at the steering worm nut member is provided with a spherically shaped guide ledge member at the end thereof and of the control valve member into which the ledge member of the arm engages is rotatably journalled, for example, by means of anti-friction bearings which may consist of two chains of anti-friction balls.

According to a further feature and development of the present invention, the housing of the steering worm and especially of the steering nut member serves simultaneously as cylinder for the latter whereby the steering nut member is used effectively as working piston. By the use of the housing as working cylinder and of the steering gear nut member as working piston, a small and compact construction of the entire steering mechanism is obtained in which, in addition to the steering worm and nut member and the housing thereof, a separate servo-cylinder with the appertaining piston is not necessary. Special circumstances and conditions, however, may sometime make it necessary that a separate servo-piston and servo-cylinder be provided as these parts may then be accommodated in any suitable place of the vehicle. In that case, the steering gear nut member serves solely as control or actuating organ, whereas the servo-piston is not formed as a unit therewith but is accommodated in a different location.

It is also possible within the scope of the present invention to bring about within certain limits changes in the transmission ratio of the steering gear in that the steering lever shaft may be equipped with a longer or shorter lever arm. For that purpose, the present invention proposes to make the lever arm adjustable or to so construct the same that it is interchangeable with lever arms of different length.

It is important for a satisfactory and trouble-free steering, and therewith for the safety of the vehicle, that the freedom from or absence of play of the individual members is assured with a steering mechanism consisting of many individual transmission members since a relatively large total amount of play may result from the summation of relatively small individual plays. The freedom from play of the transmission members in the steering worm is rendered feasible, in accordance with the present invention, by the possibility of selecting the proper size of balls for the worm and nut member. For that purpose, the steering worm and nut member are so constructed that balls of such size may be accommodated therebetween which assure freedom of play in the transmission members. Freedom of play is also assured in the thrust and anti-friction bearing which is arranged at the steering nut member and which absorbs essentially the longitudinal forces acting on the steering nut member, by the selection of the appropriate balls. The bearing may thereby be constructed of two or four parts and may be so formed that balls of different size may be inserted therein. The changed conditions resulting from the insertion of balls of different size may be taken into consideration by the insertion of compensating disks into the split outer race of the bearing. The outer race of the bearing is, for that purpose, appropriately sub-divided in the longitudinal or in the circumferential direction or in both of these directions of the steering worm.

Referring now to the drawing, wherein like reference numerals are used throughout the various views to designate like parts, and more particularly to FIGURE 1, reference numeral 1 designates the housing of the servo steering mechanism through which extends in the longitudinal direction the steering spindle 2 connected with the steering wheel (not shown). The steering spindle 2 is journalled, on the one hand, in the cover 3 of the housing 1 which may be bolted thereto by means of bearing 5, and, on the other, in the lower end part 4 thereof by means of bearings 6 and 6', respectively. The lower part 4 is also closed by an inserted terminal cover piece 7 threadably secured in any suitable manner in which a packing ring or sealing gasket 8 is arranged. A similar packing ring or sealing gasket 9 is disposed rearwardly of the bearing 5 in the part 3' of the cover 3 which is extended inwardly from the cover 3 into the steering gear mechanism.

Within the central part of the steering gear housing 1, the steering spindle 2 is formed as steering worm 10 provided with external helical grooves. The steering gear nut member 11 provided with complementary internal helical grooves is arranged around the steering worm 10. The steering nut member 11 is supported on the steering worm 10 by means of one or several chains of balls formed by anti-friction balls 12 which engage in the complementary external and internal helical grooves. An appropriately constructed external return duct 12' is provided for each chain of anti-friction balls.

The bearing which includes a subdivided outer race is arranged at one end of the steering gear nut member 11 and is intended to permit as frictionless as possible a rotation of piston 16, 16' with respect to the steering gear nut member 11. In the illustrated embodiment, the outer race 13 is subdivided in the circumferential direction thereof and the outer race may be formed, for example, of four parts by dividing it, as seen in FIGURE 5. Upon exchange of the balls 15 with those of a different size the partial gap 14 resulting therefrom may be filled by means of equalization disks or shims for purposes of adaptation thereof to the balls of different sizes and to thereby prevent any unnecessary play.

The piston member 16 provided with sealing surfaces 17 formed, for example, by appropriate packing rings, is slidably arranged in the housing 1 which at the same time serves as cylinder for the servo mechanism. The piston member 16 is movable in the cylinder housing 1 along the steering spindle 2 in either direction depending on which side thereof is subjected to the pressure oil in the cylinder housing 1. The piston part 16 which includes an extension 16' surrounds the bearing 13 circumferentially from the outside thereof and from one side thereof by the shoulder portion 16''. The extension 16' establishes the connection with the steering lever 19 by means of a semi-spherically-shaped ball member 18 which engages in the semi-spherically-shaped complementary socket of insert member 19' suitably inserted in the steering lever 19, a portion of the spring 61 loading the steering lever 19 for proper engagement with the semi-spherically-shaped ball member 18 being shown in FIGURE 2. The steering lever 19 is rigidly secured to one end of the steering lever shaft 20 in any suitable manner and extends with the portion carrying the insert member 19' overlying the axis of the steering worm with the extension 16' being disposed between on the one hand, the lever arm 19, and on the other hand, the steering nut and the worm. A sleeve 21, which forms part of the piston assembly 16, is inserted or pressed into the inner bore of the piston part 16 with the enlarged portion 21' thereof and thereby retains the bearing 13 from the side opposite that retained by shoulder 16''. The sleeve member 21 is secured in the assembled position thereof by means of a nut 22 secured to the piston part 16 in any suitable manner, for example, by means of threads or the like. It is also understood, of course, that the sleeve portion 21' is so dimensioned as to fit into the piston part 16 to provide an appropriate seal therewith.

The free end 23 of the piston part 21 slides over the inwardly extending part 3' of the cover 3 during movement of the piston assembly 16, 16', 16'', 21, 21' and 22 in the longitudinal direction of the steering column 2, a suitable packing ring again assuring a tight seal between the relatively movable parts 3' and 21.

As best shown in FIGURE 2, the steering gear nut member 11 carries at one side thereof an essentially radially extending arm 24 which is formed spherically shaped to provide an elongated guide ledge member 25 at the free end thereof. The ledge member 25 has rolling surfaces which constantly engage the walls of the annular groove or slot 27 in different rotated positions of the nut member 11. The steering gear nut member 11 actuates the control valve plunger member 26 by the engagement of the elongated guide ledge member 25 of the arm 24 in slot 27 of the control valve plunger member 26. The control valve plunger member 26 is accommodated in a housing portion 28 formed by and constituting a part of the housing 1 in such a manner that the longitudinal axis thereof extends parallel to the longitudinal axis of the steering lever shaft 20 and perpendicularly to the longitudinal axis of the steering spindle 2. The control valve member 26 is rotatably supported about the longitudinal axis thereof by means of ball bearings 29 and 30. A spring 33 is arranged between the two retainer disks 31 and 32 arranged on mutually adjacent sides of bearings 29 and 30 which seeks to bring the control valve member 26 back into the central starting or normal position thereof.

The control valve plunger member 26 (FIGURES 2 and 4) is provided with two central bores 34 and 35, respectively, forming hollow spaces which extend close to the center thereof so that only a web portion 36 remains in the central part of the control valve plunger member 26 which separates the two hollow spaces 34 and 35 from each other. A collar portion 37 having an external diameter substantially equal to the bore 62 in housing 28 surrounds the web portion 36 on the outside thereof. Inclined cross bores 38 and 39 connect the inner hollow spaces 34 and 35 to the opposite side of collar 37 with the hollow spaces or chambers 40 and 41 for the pressure oil which spaces are formed in any suitable manner, for instance, by annular grooves in the housing 28 surrounding the control valve member 26. The inner hollow spaces 34 and 35 in the control valve member 26 are closed at the outer ends thereof by piston members 42 and 43, respectively, which, upon cessation of the applied steering force at the steering column 2 are forced outwardly by pressure oil suitably led into these spaces 34 and 35 and thereby push back the control valve member 26 into the initial or normal center position thereof by the reaction forces at the housing covers 44 and 45, respectively, which are suitably secured to housing 28, for example, by means of bolts (not shown).

The housing 28 for the control valve plunger member 26 which includes a longitudinal bore 62, is further provided with a plurality of chambers or hollow spaces 63, 64 and 65 of which chamber, to which oil under pressure may be supplied continuously from a reservoir 100 through line 102 and a pump 101, is located between chambers 40 and 41, and of which chambers 64 and 65 are located above and below chambers 40 and 41, respectively.

Fluid under pressure, for example, oil, is supplied to the chamber 63 at all times by the fluid pump 101 whereas chambers 64 and 65 might be suitably connected with the discharge line 109 leading back to the fluid reservoir 100. Chamber 41 may be directly connected with the space 47 formed in housing 1 through the aperture 66 (FIGURE 2) formed in the housing 28 through which the arm 24 extends. The chamber 40 is suitably connected with the cylinder space 46, for example by a line 105 or through ducts formed in the housing 1, 28.

*Operation*

In describing the operation, it will be helpful to refer to FIGURE 2, wherein the solid and dotted arrows indicate the direction of oil flow from the pump in response to displacement of the valve member 26 upwardly and downwardly, respectively.

The operation of the servo mechanism in accordance with the present invention is as follows:

If the steering spindle 2 is set into rotation by rotating the steering wheel, then the steering gear worm 10 seeks to rotate the steering gear nut member by reason of the helical grooves provided in steering gear worm 10 and steering gear nut member 11, i.e., by the thread-like force-locking configuration which, for example, always rotates a nut member mounted upon a threaded bolt upon rotation of the latter unless the former is restrained from such rotation. The arm 24 provided at the steering gear nut member 11 and guide ledge member 25 thereof engaging in groove 27 of plunger member 26 are thereby moved against the force of spring 33, in the one or the other direction, and as a result of such movement together with the guide ledge member 25 thereof takes along the control valve plunger member 26 in an upward or downward direction.

For example, if the steering spindle 2 is rotated clockwise as viewed at the steering wheel, i.e., counterclockwise as viewed in FIGURE 2, and is provided with an external right-handed worm 10, such rotation will seek to rotate the steering gear nut member 11 in the same direction, i.e., in a clockwise direction as viewed from the steering wheel and counterclockwise as viewed in FIGURE 2 since bearing 13 is intended to permit as frictionless as possible a rotation of steering gear nut member 11 with respect to piston 16, 16′. Upon such movement of the steering spindle 2 and of the steering gear nut member 11, the latter thereby raises also the control valve plunger member 26 a small distance in the upward direction, for example, a distance of 0.5 mm., if the force exerted at the steering wheel, increased by the ratio of the lever arm of the steering wheel radius to the center of the steering spindle and the center of the steering spindle to the center of the guide ledge member 25, overcomes the pre-tensioned force of spring 33, which, for example, may be of the order of 2.5 kg. As a result of such upward movement, the collar 37 will begin to throttle the connecting passage area existing between chambers 63 and 40 while the lower end portion of the control valve plunger member 26 will throttle the connecting passage area existing between the chamber 41 and the chamber 65. Fluid under pressure from chamber 63 will thereby be prevented from reaching chamber 40 and therewith the discharge line connected with chamber 64 while simultaneously therewith the space 41 is disconnected from the discharge line connected with chamber 65 so that sufficient servo-pressure can build up in chamber 41 which will aid the steering movement by a corresponding pressure increase in cylinder space 47, Thus, rotation of the steering spindle in this direction will rotate the steering gear nut member 11, free to rotate in bearing 13, through a relatively small angle which is sufficient, however, to move control valve plunger member 26 upwardly and therewith bring into action the servo-system which will immediately build up pressure in space 47 and apply a servo-force on the piston assembly 16, 16′, 21 and 22 and therewith on the steering gear nut member 11 seeking to displace the same axially toward the right as viewed in FIGURE 1, so that the nut member 11 will move axially rather than rotate upon further rotation of the steering spindle 2. At the same time, the oil in cylinder space 46 is permitted to flow off through chamber 64 and a discharge line connected therewith.

Thus, admission of oil into the cylinder space 47 and discharge thereof from cylinder space 46 will cause movement of the piston assembly 16, 16′, 21, 21′ and 22 toward the right as viewed in FIGURE 1, and thereby rotates the steering shaft 20 for such a length of time as steering force is exerted on the steering column 2. Upon cessation of the application of the steering force on the steering column 2, the control valve plunger member 26 moves again downwardly which downward movement is initiated by the spring 33 originally compressed during the upward movement thereof. In addition thereto, the hollow space 35 is placed under the same oil pressure as exists in space 41 through the inclined bore 39 while the hollow space 34 is at the discharge pressure existing in space 40 through inclined bore 38. This differential pressure also seeks to return the control valve plunger member 36 to the original center position thereof by reason of the reaction forces exerted on the reaction surface 48′ of piston 43.

An analogous movement takes place during rotation of the steering wheel and therewith of the steering spindle 2 in the opposite direction whereby the steering spindle 2 and steering gear nut member 11 are rotated in the clockwise direction as viewed in FIGURE 2, thereby moving the arm 24 and therewith control valve plunger member 26 in a downward direction. As a result of such downward direction, collar 37 throttles the connecting passage area existing between chamber 63 and chamber 41 while the upper end portion of the control valve member 26 throttles the passage between chambers 64 and 40. Consequently, pressure will build up this time in chamber 40 which will be supplied to the cylinder space 46 thereby causing the movement of the piston assembly 16, 16', 21, 21' and 22 and therewith of the steering gear nut member 11 in the direction toward the left of FIGURE 1 and thereby causing rotation of steering shaft 20 in the opposite direction.

As soon as the steering forces again cease at the steering column 2, the control valve member 26 is again returned to the initial or normal center position thereof as explained hereinabove.

Both pistons 42 and 43 are kept in continuous contact with the covers 44 and 45 by means of springs 49 and 49', respectively, in order to prevent rattling of the pistons 42 and 43 during travel of the vehicle.

It should also be noted that the bearing 13 permits to obtain the desired essentially frictionless connection between the steering gear nut member 11 and the piston member 16, 16'. This is of importance since axial movement of the nut member 11 and therewith of the piston assembly 16, 16', 21, 21' and 22 will rotate the steering lever shaft 20 by the engagement of the ball-shaped member 18 with the socket 19' of arm 19. Since arm 19 and therewith socket 19' does not move in a straight line but instead rotates about the axis of steering lever shaft 20, axial movement of the piston assembly 16, 16', 21, 21' and 22 also requires and brings with it a slight rotation of the extension 16' and of piston 16 when the socket member 19' describes an arc. This would also contribute to the movement of the arm 24 attached to the steering gear nut member 11 since such rotation would also be transmitted to the steering gear nut member 11 except for the presence of bearing 13.

Since the nut member 11 and the piston assembly 16, 16', 21 and 22 move in the axial direction, the slot 66 must be of elongated shape. Moreover, the guide member 25 forms a ledge-like assembly having a predetermined length in the axial direction of the steering spindle 2 so as to assure proper engagement thereof with the groove 27 of the control valve plunger member 26 regardless of the axial position of the nut member 11 and therewith of the arm portion 16' of the piston assembly.

The upper and lower wall portions defining slot 66 thereby form abutment surfaces for arm 24 during steering movements without the aid of servo-power, i.e., for example, when no oil pressure is available during standstill of the engine so as to limit rotation of the steering gear nut member 11. When the servo-system is operating properly, this is accomplished by the axial pressure exerted by the servo-medium on the piston assembly 16, 16', etc., and therewith on the steering gear nut member 11.

It should also be noted that the lever arm 19 is preferably so arranged as to travel along an arc disposed only to one side of a plane containing the axis of steering lever shaft 20 and perpendicular to steering spindle 2, i.e., to the left of this plane as viewed in FIGURE 1, as the steering column is rotated from one end position to the other in order to prevent erroneous operation of plunger member 26 as might occur when lever arm 19 passes from one side to the other of this plane along its arcuate travel.

It may at times be desirable to utilize the mechanism including housing 1, 28 as disclosed herein with a steering spindle provided with a worm having left-handed external grooves. In order to enable use of the assembly with a left-handed thread of the steering worm and without the necessity of changing the housing or any connections of the fluid system, it is only necessary to substitute a control valve plunger member 50 shown in FIGURE 3 for the control valve member 26 of FIGURES 2 and 4. The control valve member 50 is different from the embodiment described in connection with FIGURES 1, 2 and 4 by the arrangement of the cross bores 51 and 51' which establish the connection from the pressure oil chambers 40 and 41 with the interior hollow spaces 35' and 34', respectively. Furthermore, instead of a single collar 37, the plunger member 15 is provided with three collars 52, 53 and 54.

Otherwise the operation by means of the control valve member 50 illustrated in FIGURE 3 is, in principle, essentially the same as that illustrated in connection with FIGURES 1, 2 and 4 except that during upward movement of the control valve plunger member 50, collar 53 throttles the passage area between chambers 63 and 41 while collar 52 throttles the area between chambers 64 and 40 so that oil under pressure is supplied from chamber 40 to cylinder space 46 which is necessary to move the nut member 11 and piston assembly 16, 16', 21 and 22 toward the left as viewed in FIGURE 1, i.e., the normal movement thereof during counterclockwise rotation of the steering spindle, as viewed in FIGURE 2, with a left-handed thread.

Movement of the steering spindle in the opposite direction will result in oil under pressure being applied to the cylinder space 47 by the throttling effect of collar 54 of the area connecting the spaces 41 and 65 and by the throttling effect of the collar 52 between the spaces 40 and 63.

In summary, the essential feature of the present invention resides in that the actuating member, displacing the control valve member 26, namely, the arm 24 with the guide ledge member 25, is mounted directly on the steering gear nut member. As a result thereof, the lost or idle motion which must be traversed at the steering wheel to initiate the auxiliary force of the servo system is very small.

In known prior art systems, the corresponding actuating member is itself actuated by axial displacement of the steering spindle. The steering spindle in such prior art devices is provided with a springy longitudinal bearing. As a result of the gearing-down ratio of the worm, significantly larger lost or idle motions are necessary before the auxiliary force of the servo systems is initiated. The movement from the springy longitudinal bearing is transmitted to the control valve member over a link and lever system which requires a large amount of space and also exhibits a relatively large amount of play in the joints thereof.

These disadvantages are avoided by the present invention in which the control valve member 26 in the central position thereof may be disposed at a small distance only, for example, 0.5 mm., from the throttling edges in the housing 28. Consequently, only a corresponding short path must be traversed at the steering wheel to render the servo system responsive which path depends on the diameter of the steering wheel. Moreover, since spring 33 may be pre-tensioned only relatively slightly, for example, 2.5 kg., only a relatively slight force is necessary at the steering wheel in order to displace the control valve plunger member 26 in the one or the other direction over nut member 11, arm 24 and guide ledge member 25.

While we have shown and described two preferred embodiments in accordance with the present invention, it is understood that the same is not limited thereto but is susceptible of many changes and modifications within the spirit of the present invention and we intend to cover all such changes and modifications as defined by the appended claims.

We claim:
1. A servo steering mechanism for motor vehicles provided with a steering spindle comprising a worm and a movable steering gear nut member mounted on said worm by means of anti-friction ball means, comprising a steering lever shaft having a lever arm at one end thereof overlying the axis of said worm, connecting means including a further member connecting said lever arm with said nut member and movable relative to both said lever arm and said nut member, and power steering means to aid the steering movement of said steering spindle including a unitary control valve member movable to effect control of the servo mechanism, and actuating means including said steering gear nut member for actuating said control valve member directly by engagement with and by movement of said steering gear nut member to initiate operation of said power steering means.

2. A servo steering mechanism according to claim 1, wherein said control valve member is movable by said nut member in a direction generally perpendicular to the longitudinal axis of said steering spindle.

3. A servo steering mechanism for motor vehicles having a steering spindle comprising a worm and a movable steering gear nut member mounted on said worm by means of anti-friction ball means, comprising a steering lever shaft having a lever arm at one end thereof, connecting means movable relative to both said lever arm and said nut and including rolling-type bearings connecting said lever arm with said steering gear nut member to enable essentially frictionless relative rotary movement between said steering lever shaft and said steering gear nut member, and power steering means to aid the steering movement of said steering spindle including a control means, and actuating means including said steering gear nut member for actuating said control means by the rotary movement of said nut member due to the thread-like force-locking configuration of said worm to initiate operation of said power steering means.

4. A servo steering mechanism for motor vehicles having a steering spindle comprising a worm and a movable steering gear nut member mounted on said worm by means of anti-friction ball means, comprising a steering lever shaft having a lever arm at one end thereof, connecting means connecting said lever arm with said steering gear nut member, power steering means to aid the steering movement of said steering spindle including a piston and means comprising a control valve member for controlling operation of said piston, actuating means including said steering gear nut member for actuating said control valve member by the rotary movement of said steering gear nut member due to the thread-like locking configuration between said steering spindle and said nut member to initiate operation of said power steering means, said connecting means being interconnected with said piston and said nut member for movement axially of said spindle as a unit, and a housing in which said unit is movable axially of said spindle.

5. A servo steering mechanism according to claim 1, wherein said actuating means includes an arm arranged at said steering gear nut essentially perpendicularly to the longitudinal direction of said steering spindle which displaces said control valve member in one or the other direction.

6. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means including an intermediate part connecting said lever arm with said steering gear nut member, said part being rotatably connected with each of said lever arm and said nut member, and power steering means to aid the steering movement of said steering spindle including control means therefor, actuating means utilizing said steering gear nut member as actuating member for said control means in response to rotation of said nut member to initiate operation of said power steering means, said connecting means including a piston that is part of said power steering means and is coaxial with and rotatably connected to said nut for movement therewith as a unit, and a housing in which said unit is movable axially of said spindle.

7. A servo steering mechanism according to claim 6, further comprising anti-friction ball means between said nut member and said piston permitting rotation but blocking relative axial movement therebetween.

8. A servo steering mechanism according to claim 1, further comprising a housing for said control valve member, and wherein said control valve member is provided at each end thereof with a cylinder space, a piston for each of said cylinder spaces extending therebeyond, and wherein said cylinder spaces are connected with respective pressure chambers provided in said control valve member housing to return said control valve member to the initial position thereof by the pressure in the respective cylinder space.

9. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means including an intermediate part connecting said lever arm with said steering gear nut member, said part being connected for angular movement with respect to each of said lever arm and said nut member and power steering means to aid the steering movement of said steering spindle including control means therefor, actuating means utilizing said steering gear nut member as actuating member for said control means to initiate operation of said power steering means in response to rotation of said nut member, and a housing constituting a cylinder for said steering gear nut member, the latter as part of said power steering means simultaneously serving as working piston in said cylinder.

10. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means including an intermediate part connecting said lever arm with said steering gear nut member, said part being connected for angular movement with respect to each of said lever arm and said nut member and power steering means to aid the steering movement of said steering spindle including control means therefor, actuating means utilizing said steering gear nut member as actuating member for said control means to initiate operation of said power steering means in response to rotation of said nut member, and said power steering means including means forming a cylinder space about said steering gear nut member, and piston means secured against axial movement relative to said nut member and operative within said cylinder space, said piston means dividing said cylinder space into two parts, and wherein said control means is operative to selectively supply fluid under pressure to one side or the other of said piston means into said cylinder space so as to actuate the steering mechanism.

11. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means connecting said lever arm with said steering gear nut member, said connecting means including a structure connected for angular movement with respect to each of said lever arm and said nut member, and power steering means to aid the steering movement of said steering spindle including control means therefor, and actuating means utilizing said steering gear nut member as actuating member for said control means to initiate operation of said power steering means in response to rotation of said nut member, said connecting means including a spring loaded semi-spherically shaped ball and socket connection and a linking portion connected to one part of said ball and socket between said steering gear nut member and said lever arm, said linking portion being movable relative to both said nut member and said lever arm during operation of said steering mechanism.

12. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means, including anti-friction ball means, connecting said lever arm with said steering gear nut member, said connecting means including a member rotatably connected to said nut member by means of said second-mentioned anti-friction ball means and pivotally connected to said lever arm by a ball and socket connection, and power steering means to aid the steering movement of said steering spindle including control means therefor, and actuating means utilizing said steering gear nut member as actuating member for said control means to initiate operation of said power steering means in response to rotation of said nut member, said steering spindle worm and said nut being provided with complementary helical grooves so constructed that balls forming said first-mentioned anti-friction ball means of such size may be inserted therein which assure freedom from play in the steering motion transmitting members.

13. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means connecting said lever arm with said steering gear nut member, and power steering means to aid the steering movement of said steering spindle including control means therefor, and actuating means utilizing said steering gear nut member as actuating member for said control means to initiate operation of said power steering means, said connecting means including bearing means having an outer race formed of two parts to enable insertion of anti-friction balls of different size and shim means between said two parts to compensate for the balls of different size.

14. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means connecting said lever arm with said steering gear nut member, and power steering means to aid the steering movement of said steering spindle including control means therefor, and actuating means utilizing said steering gear nut member as actuating member for said control means to initiate operation of said power steering means, said connecting means including bearing means having an outer race formed of four parts to enable insertion of anti-friction balls of different size and shim means between at least some of said parts to compensate for the balls of different size.

15. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means connecting said lever arm with said steering gear nut member, and power steering means to aid the steering movement of said steering spindle including control means therefor, and actuating means utilizing said steering gear nut member as actuating member for said control means to initiate operation of said power steering means, said connecting means including a bearing having a subdivided outer race with at least one gap between the parts thereof and disposed perpendicularly to the longitudinal direction of said steering spindle.

16. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means connecting said lever arm with said steering gear nut member, and power steering means to aid the steering movement of said steering spindle including control means therefor, and actuating means utilizing said steering gear nut member as actuating member for said control means to initiate operation of said power steering means, said connecting means including a bearing having a subdivided outer race with at least one gap between parts thereof and disposed in the circumferential direction of said steering spindle.

17. A servo steering mechanism for motor vehicles having a steering spindle comprising a worm and a movable steering gear nut member mounted on said worm by means of anti-friction ball means, the combination comprising a steering lever shaft having a lever arm at one end thereof, connecting means including an intermediate part connecting said lever arm with said steering gear nut member, said part being connected for angular movement with respect to each of said lever arm and said nut member and power steering means to aid the steering movement of said steering spindle including control means therefor, and actuating means utilizing said steering gear nut member as actuating member for said control means to initiate operation of said power steering means in response to rotation of said nut member, said steering gear nut member serving exclusively as actuating organ and wherein said power steering means includes servo-piston means acting upon and substantially coaxially with said nut member.

18. A servo steering mechanism for motor vehicles provided with a steering spindle that includes a worm and a movable steering gear nut member mounted on said worm by means of anti-friction ball means, comprising a steering lever shaft having a lever arm at one end thereof, connecting means connecting said lever arm with said nut member and movable relative to both said lever arm and said nut member, hydraulic power steering means to aid the steering movement of said steering spindle including a unitary control valve member having a plurality of annular hydraulic fluid control passages therein and being movable to effect control of the servo mechanism, and actuating means including said steering gear nut member for actuating said control valve member directly by engagement with and by rotatable movement of said steering gear nut member to initiate operation of said power steering means, said actuating means including an arm arranged at said steering gear nut essentially perpendicularly to the longitudinal direction of said steering spindle, said arm at said steering gear nut being provided at a free end thereof with a rolling surface portion engaging in an annular groove in said control valve member for actuating the latter in opposite directions, and means for supporting said control valve member for rotation about its axis and including fluid passages cooperating with said control valve member whereby the control function of said valve member is not changed by mere rotation about its axis.

19. A servo steering mechanism for motor vehicles provided with a steering spindle that includes a worm and a movable steering gear nut member mounted on said worm by means of anti-friction ball means, comprising a steering lever shaft having a lever arm at one end thereof, a connecting structure including said steering gear nut member and a part connected for angular movement with respect to each of said nut member and said lever arm for interconnecting said worm and said lever arm for actuating the latter in response to rotation of said worm, hydraulic power steering means to aid the steering movement of said steering spindle including a control valve member movable to effect control of the servo mechanism, and actuating means including said steering gear nut member for actuating said control valve member by rotational movement of the steering gear nut member to initiate operation of said power steering means, said power steering means including a housing for said structure and serving simultaneously as a cylinder within which said connecting structure which includes said steering gear nut member is operative as a working piston to aid the steering movement.

20. A servo steering mechanism according to claim 1, wherein said unitary control valve member includes passages therein, the orientation of which passages determines the directional sensitivity of the servo mechanism, and housing means for enclosing said control valve and cooperaing therewith to regulate the operation of said power steering means in response to displacement of said control valve member.

21. A servo steering mechanism according to claim 17, wherein said servo piston means is an annular piston structure encircling said steering spindle.

22. A power steering unit for motor vehicles comprising a steering shaft with a lever arm extending therefrom, a steering spindle having a worm, a unitary structure including a piston and a nut rotatably connected with said piston, said nut being mounted on said worm by means of intermediate anti-friction ball means, hydraulic power steering means including said piston and a valve means operatively connected with said nut for controlling a fluid pressure upon said piston to apply an auxiliary steering force to said piston in response to rotation of said nut, said nut being movable axially of said steering spindle upon said worm and rotatably with respect thereto in response to turning movement of said spindle and the resistance to a steering force exerted by said steering shaft, said piston having a pivotal connection with said lever arm and being rotatable about the axis of said steering spindle in a manner substantially exclusively dependent upon the displacement of said pivotal connection.

23. A power steering unit according to claim 22, wherein said piston means forms an outer part of said unitary structure and includes an arm extending therefrom to form said pivotal connection between the piston and said lever arm.

24. A power steering unit according to claim 22, wherein said pivotal connection includes relatively movable parts comprising a member having a generally spherically shaped surface and a cooperating spherically shaped socket.

References Cited in the file of this patent

UNITED STATES PATENTS

| | | |
|---|---|---|
| 2,037,505 | Eaton | Apr. 14, 1936 |
| 2,605,854 | MacDuff | Aug. 5, 1952 |
| 2,688,260 | Muller | Sept. 7, 1954 |